United States Patent [19]

Yaniv et al.

[11] Patent Number: 4,589,733
[45] Date of Patent: May 20, 1986

[54] DISPLAYS AND SUBASSEMBLIES HAVING IMPROVED PIXEL ELECTRODES

[75] Inventors: Zvi Yaniv, Southfield, Mich.; Yair Bar-on, Haifa, Iceland; Vincent D. Cannella, Birmingham; Gregory L. Hansell, Ann Arbor, both of Mich.

[73] Assignee: Energy Conversion Devices, Inc., Troy, Mich.

[21] Appl. No.: 626,133

[22] Filed: Jun. 29, 1984

[51] Int. Cl.$^4$ ............................................. G02F 1/133
[52] U.S. Cl. ..................................... 350/332; 350/333
[58] Field of Search ............................. 350/332–334, 350/357; 357/2

[56] References Cited

U.S. PATENT DOCUMENTS

| | | | |
|---|---|---|---|
| 3,073,992 | 1/1963 | Wolfe | 350/333 |
| 3,603,984 | 9/1971 | Heilmeier | 350/336 |
| 3,630,015 | 12/1971 | Lehovec | 350/334 X |
| 3,654,606 | 4/1972 | Marlowe et al. | |
| 3,834,794 | 9/1974 | Soref | 350/336 X |
| 3,883,227 | 5/1975 | Kobayashi et al. | 350/336 |
| 4,008,564 | 2/1977 | Luce et al. | 350/332 X |
| 4,163,677 | 8/1979 | Carlson | 357/2 X |
| 4,170,772 | 10/1979 | Bly | 350/374 X |
| 4,223,308 | 9/1980 | Baraff et al. | 350/334 X |
| 4,226,898 | 10/1980 | Ovshinsky et al. | |
| 4,537,471 | 8/1985 | Grinberg et al. | 350/332 X |

OTHER PUBLICATIONS

Szydlo et al, "New Amorphous Silicon Nonlineal Element for Liquid Crystal Display Addressing", Appl. Phys. Lett., 44(2) Jan. 15, 1984.
Hayama et al, "Amorphous–Silicon Thin-Film Metal-Oxide-Semiconductor Transistors", Appl. Phys. Lett., 36(9) May 1, 1980, pp. 754–755.

*Primary Examiner*—John K. Corbin
*Assistant Examiner*—David Lewis
*Attorney, Agent, or Firm*—Lawrence G. Norris; Robert S. Nolan; Richard O. Gray, Jr.

[57] ABSTRACT

Light influencing subassemblies and displays each having a structure in which all of the pixel electronic circuitry, including isolation devices where utilized, are located at one electrode side of each pixel electrode combination. The structure includes the subdivision of one pixel electrode into at least two spaced apart side-by-side electrode segments opposite a common electrode. The displays include light influencing material disposed between the segmented and common electrodes. The electrode segments further can include at least one isolation device coupled to at least one of the segments which facilitates selective excitation of the pixel elements and applied potential reversal across the electrodes during alternate display frames. The displays have an increased manufacturing yield, reduced capacitance and increased isolation. Also disclosed is a method of making the subassemblies and displays.

5 Claims, 10 Drawing Figures

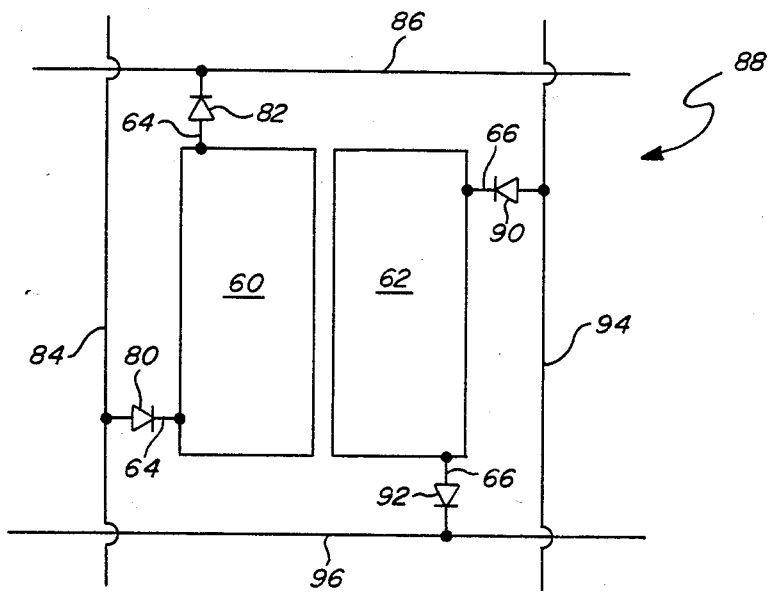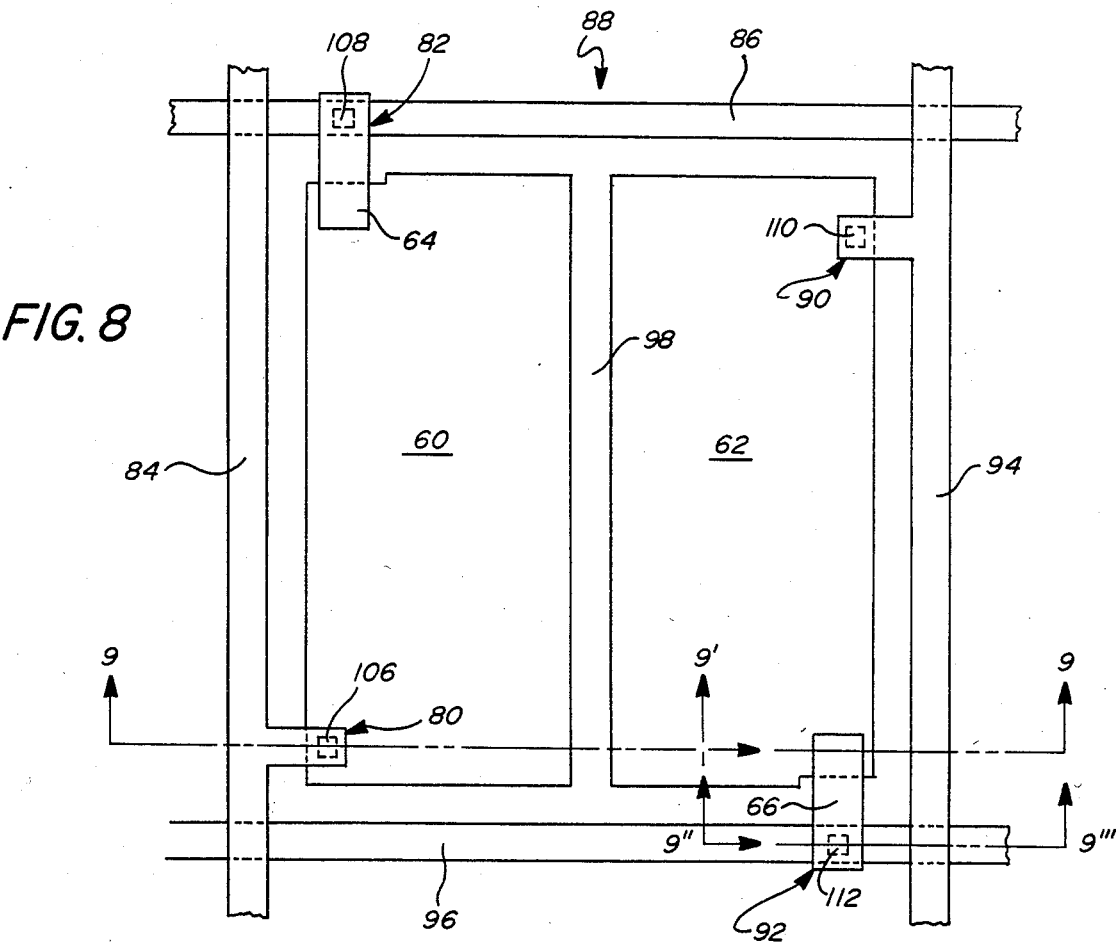

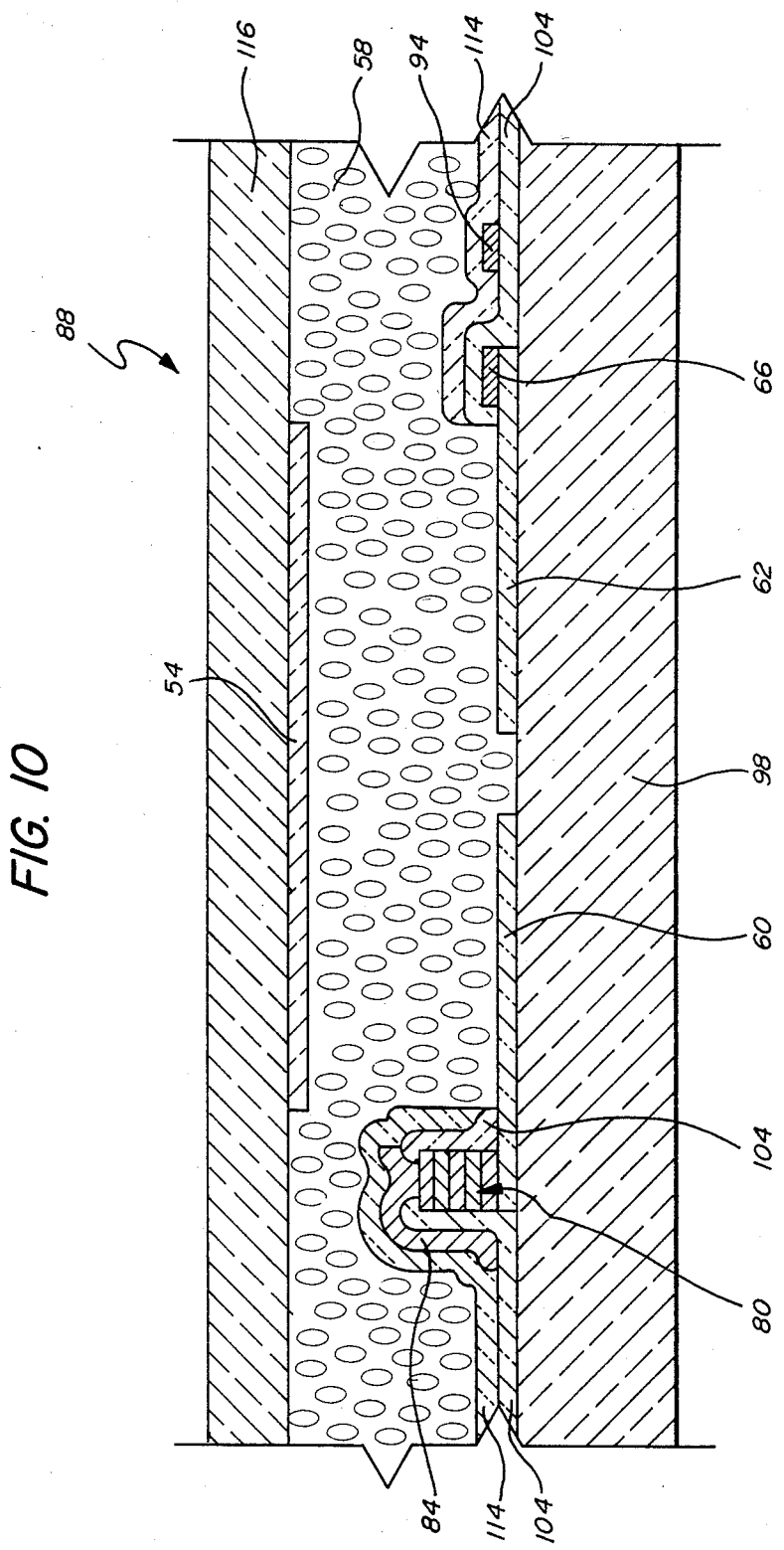

DISPLAYS AND SUBASSEMBLIES HAVING IMPROVED PIXEL ELECTRODES

FIELD OF THE INVENTION

The present invention relates generally to light influencing displays and more particularly to light influencing display subassemblies and displays.

BACKGROUND

There are many applications wherein light influencing displays are utilized to advantage. For example, light influencing displays find use in digital watches, digital clocks, calculators, pocket sized television receivers, and various forms of portable games, to name just a few.

Light influencing displays can be formed in many configurations. By the term "light influencing material" is meant any material which emits light or can be used to selectively vary the intensity, phase, or polarization of light either being reflected from or transmitted through the material. Liquid crystal material is only one such material having these characteristics. Generally, each pixel includes a pair of electrodes which can be individually addressable. As is well known, when a voltage is applied across the electrodes, the optical properties of the light influencing material can be changed to provide a light or dark display depending upon the type of material used and the desired mode of operation of the display.

An increasingly important type of light influencing display matrix includes a large number of pixel elements arranged in rows and columns. Because of the large number of pixels in the matrix arrays, the electrode line connections to each pixel are on common lines with other pixels. In this so-called multiplexing scheme, each pixel is located at a unique intersection of two address lines. The pixels are individually addressed by applying a voltage potential across its two intersecting lines. The utilization of this multiplexing scheme relies upon the innate voltage threshold characteristic of the display material, which provides an optical change only for applied potentials greater than the threshold voltage. Thus, pixels can experience an increased voltage potential, because they are coupled to one of the address lines with an applied potential, but they will not be activated because the potential increase caused by the potential on one line is below the threshold voltage of the pixel.

Matrix light influencing displays, such as liquid crystal displays which rely only upon the innate liquid crystal display threshold voltage to differentiate the applied voltage potentials are limited in the number of pixels, contrast and speed because of the finite sharpness of the threshold voltage. To achieve high resolution liquid crystal display matrices with large numbers of pixels with acceptable contrast and speed, it is necessary to include an additional isolation device at each pixel to provide adequate isolation from potentials applied to other pixels on the common address lines. These so-called active matrix liquid crystal displays utilize a number of types of two or three terminal isolation devices to provide the required isolation from the applied voltage potentials. By the term "isolation" is meant any device which enhances the ability for one pixel to be addressed (switched) without switching other pixels on a common address line. Such "isolation" can include threshold devices such as diodes in various configurations, M-I-M structures, etc., which provide a more precise voltage threshold than that provided by the light influencing material itself. A more precise voltage threshold means a smaller variance in the voltage (smaller Δv) required to switch the pixel from off to on. Other examples of isolation devices can include switching devices, such as thin film transistors, which can have a very small Δv.

Some two terminal isolation devices, such as diodes and some configurations of three terminal devices can be thought of as single polarity devices, which can be turned on in only one direction or polarity. Three terminal devices, such as thin film transistors and other two terminal devices, such as diode rings, threshold switches, metal-insulator-metal (M-I-M) devices and N+-I-N+ devices, can be thought of as dual polarity devices which can be turned on in two directions or polarities.

One problem in using active matrix light influencing displays is yield. Virtually one-hundred percent of all of the isolation devices must be operational to obtain a useable display. Such yields can be difficult to achieve for large area displays, because the making of active matrix displays requires numerous process steps, many of which can require extremely accurate photolithography.

Diodes suitable for isolation devices in active matrix display applications are disclosed in U.S. application Ser. No. 573,004, entitled "Liquid Crystal Displays Operated By Amorphous Silicon Alloy Diodes", in the names of Zvi Yaniv, Vincent D. Cannella, Gregory L. Hansell and Louis D. Schwartz, filed Jan. 23, 1984, which is incorporated herein by reference. The diodes can be formed without the need of precise photolithography and in fewer process steps than that required to form some of the prior isolation devices.

The individual pixel structures in prior light influencing displays result in lower frequency operation, more complex electronic circuitry, less flexibility, reduced yield and less isolation than desired. Whether utilizing diodes or transistors as isolation devices, the prior circuits have the pixel isolation devices, one address line and one electrode on one substrate or plane and the other electrode and address line on the other plane. In effect, the display material and the two electrodes form a capacitor which limits the operational frequency. The electronic circuitry is more complex than desired and limits the flexibility of the displays, since both planes have circuitry thereon. Where there is no redundancy in the pixel isolation devices, any one inoperative device will cause an inoperative pixel element reducing the display yield. Further, the prior display pixels in attempting to reduce the circuitry on both planes, generally are limited to a pair of electrodes with the isolation device or devices only on one plane and coupled to only one electrode address line on that plane.

SUMMARY OF THE INVENTION

The present invention provides a display of the type having a structure in which all of the electronic circuitry, including isolation devices where utilized, is located at one electrode side of each pixel electrode combination. The structure includes the subdivision of one pixel electrode into at least two spaced apart side-by-side electrode segments on one plane opposite one common electrode on a second plane for each pixel. Light influencing material is disposed between the electrode segments and the common electrode. The segmented electrode can increase the operational frequency while decreasing the electronic complexity of the display. The address lines can be coupled to each segmented electrode by one or more isolation devices to provie more complete pixel isolation and to increase the manufacturing yield of the displays.

The present invention provides a display including at least one pixel element. The pixel element is formed with a segmented electrode including at least a pair of spaced apart electrode segments, a common electrode spaced from the segmented electrode in substantially parallel relation thereto, with light influencing material between the segmented electrode and the common electrode. At least one isolation device can be coupled to the electrode segments and a pair of isolation devices preferably can be coupled to the electrode segments. The isolation devices can be diodes which can be formed from a deposited semiconductor material. The deposited semiconductor material is preferably an amorphous semiconductor alloy including silicon. The diodes preferably include a first doped semiconductor region, a substantially intrinsic semiconductor region overlying the first doped region, and a second doped semiconductor region opposite in conductivity with respect to the first doped region overlying the intrinsic region.

The present invention further provides a display subassembly, which display includes at least one pixel element. The subassembly includes a substrate, a segmented electrode including at least a pair of spaced apart electrode segments formed on the substrate and at least one address line coupled to each of the electrode segments. The subassembly can include isolation devices coupling one or both lines to the electrode segments and formed on the same plane or substrate.

The present invention also provides a method of making a display which includes at least one pixel element. The method includes providing a substrate, forming a segmented electrode including at least a pair of spaced apart electrode segments on the substrate, forming at least one address line for each of the electrode segments, forming a common electrode overlying the electrode segments and applying light influencing display material between the segmented electrode and the common electrode. The method can include forming isolation devices coupling the address lines to the electrode segments.

The invention still further provides a method of making a display subassembly, which display includes at least one pixel element. The method includes providing a substrate, forming a segmented electrode including at least a pair of spaced apart electrode segments on said substrate and forming at least one address line coupled to each of the electrode segments. The method can include forming isolation devices to couple one or both of the address lines to the electrode segments.

The display subassembly can then have light influencing display material applied between at least the segmented electrode and the common electrode to form a completed display.

DESCRIPTION OF THE DRAWINGS

FIG. 7 is a partial schematic and diagrammatic diagram of a display pixel subassembly embodying the present invention;

FIG. 8 is a top plan view of one display pixel subassembly embodying the present invention;

FIG. 8 is a cross sectional side view of the display pixel subassembly of FIG. 8 taken along the lines 9—9', 9'—9" and 9"—9'" of FIG. 8; and FIG. 10 is a second cross sectional side view of the completed display pixel of FIG. 8 taken along the line 9—9 of FIG. 8 with the light influencing material applied.

DESCRIPTION OF THE PREFERRED EMBODIMENTS

Figure 1:
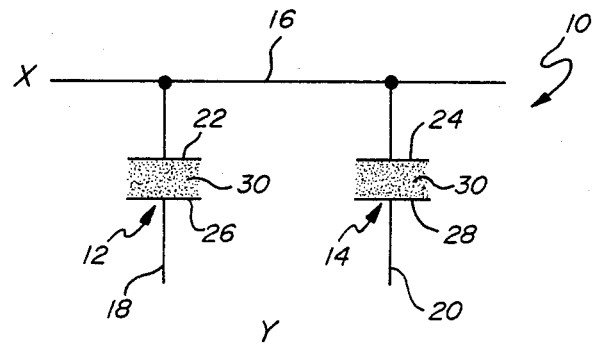
FIG. 1 is a schematic circuit diagram of a prior art multiplexed liquid crystal display.

Referring now to FIG. 1, a schematic diagram of a prior art liquid crystal display 10 is best illustrated. The liquid crystal display 10 includes a pair of pixels 12 and 14. The liquid crystal display 10 can include a first common x addressing line 16 which is coupled through the pixels 12 and 14 to respective y addressing lines 18 and 20. The x addressing line 16 is generally formed on one plane or substrate (not illustrated) and is coupled to a first electrode 22 and 24 of the pixels 12 and 14. The y addressing lines 18 and 20 are generally formed on a second plane or substrate (not illustrated) and are coupled to a respective second electrode 26 and 28. A liquid crystal display material 30 is applied between the electrodes 22 and 26, 24 and 28, which effectively forms a capacitor with the electrodes. The pixels 12 and 14 can also include separate x addressing lines.

Figure 2:
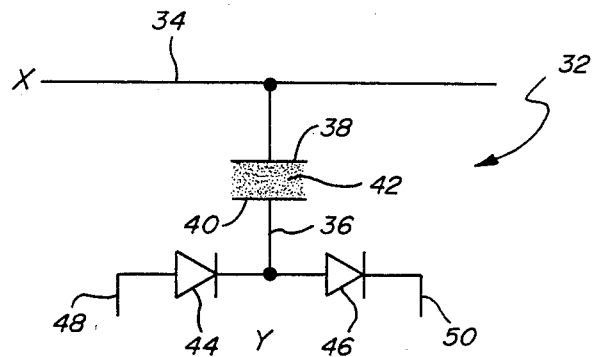
FIG. 2 is a schematic circuit diagram illustrating a display pixel with isolation devices.

Referring now to FIG. 2, a schematic diagram of an improved light influencing display pixel 32 is best illustrated. The pixel 32 is fully disclosed in above-referenced application Ser. No. 573,004. The pixel 32 includes a first x addressing line 34 which is coupled through the pixel to a y addressing line 36. The addressing line 34 is generally formed on one plane or substrate (not illustrated) and is coupled to a first electrode 38. The y addressing line 36 is generally formed on a second plane or substrate (not illustrated) and is coupled to a second electrode 40. A light influencing material, such as liquid crystal display material 42 is applied between the electrodes 38 and 40, which again effectively forms a capacitor. Again, as above mentioned, by the term "light infuencing material" is meant any material which emits light or can be used to selectively vary the intensity, phase, or polarization of light either being reflected from or transmitted through the material. Liquid crystal material being one such material having these characteristics.

The y addressing line 36 typically includes at least one dual polarity isolation device, such as a transistor (not illustrated) or a pair of single polarity isolation devices 44 and 46. Each of the devices 44 and 46 has a respective address line 48 and 50, respectively. The devices 44 and 46 are illustrated as diodes for simplicity, but can be any type of single polarity isolation device. Again, as above mentioned, by the term "isolation device" is meant any device which enhances the ability for one pixel to be addressed (switched) without switching other pixels on a common address line.

It is known that the useful life of a nematic liquid crystal display material can be extended if the polarity of the applied voltage potential is periodically reversed, such as during alternate display frames. This can be accomplished, for example, with the pixel 32 by applying a positive potential on line 48 and a negative potential on line 34 during one frame or time period to forward bias the diode 44 and effectively charge the capacitor in one polarity. The next time period or frame, a positive potential is applied to the line 34 and a negative potential is applied to the line 50 to forward bias the diode 46. Repeating this sequence causes the potential applied to the capacitor and hence the liquid crystal display material 42 to be reversed during alternate frames. The switching speed or frequency is limited by the time is takes to charge the capacitor.

The pixels 12, 14 and 32 require that electronic circuitry be formed on both planes which requires connectors to both planes on opposite sides of the liquid crystal display material. The operating frequency is limited by the capacitor formed by the pixel electrodes and the liquid crystal display material. Full isolation for the pixels can only be accomplished by adding isolation devices to the x addressing line 16 or 34, further complicating the circuitry on the second plane. Also, no redundancy is provided for the isolation devices 44 and 46 and if one is defective the pixel 32, and hence the display, will be defective. Although just one pixel element is illustrated in the FIGS. 1 and 2, it can be appreciated that many such pixels can be formed in for example, a row and column arrangement to provide a complete liquid crystal display of any size.

Figure 3:
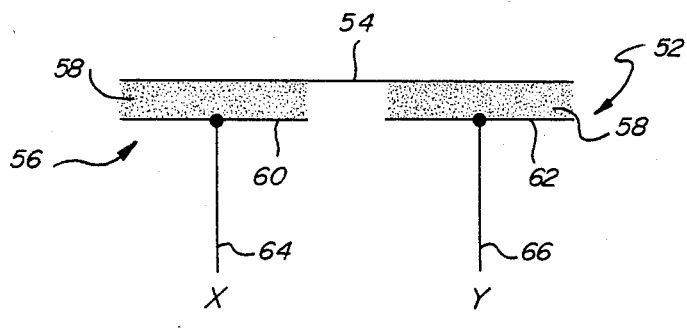
FIG. 3 is a schematic circuit diagram illustrating a first display pixel embodying the present invention.

FIG. 3 illustrates a first pixel embodiment 52 of the invention. The pixel 52 includes a common electrode 54 having at least one electrode segment on one plane (not illustrated) separated from a second segment electrode 56 on a second plane (not illustrated) by a light influencing material, such as liquid crystal display material 58. The segmented electrode 56 is subdivided into at least a pair of spaced apart electrode segments 60 and 62 coupled to separate respective x and y address lines 64 and 66. The electrode segments 60 and 62 provide the pixel 52 with a number of advantages over the pixels 12, 14 and 32. All the electronic circuitry can be formed on the same plane with the electrode segments 60 and 62. The common electrode 54 on the opposite plane can merely be a floating electrode with no pixel addressing circuitry connected to it.

Further, the electrode segments 60 and 62, the liquid crystal display material 58 and the common electrode 54 result in a capacitor with one-quarter of the capacitance of the above described capacitors. Assuming the liquid crystal display material is the same, and the electrode spacing is the same, then the result is two capacitors, each equivalent to one-half the prior capacitors, in series. These two capacitors in series result in one-quarter the capacitance which requires twice the voltage, but one-half the charge to obtain the same field. Thus, utilizing the same current, the frequency is doubled.

If the liquid crystal display material 58 is a nematic liquid crystal display material, the applied voltage potential should be reversed periodically, such as the beginning of each frame. This can be accomplished by applying a positive potential on line 64 and a negative potential on line 66 in the first time frame. In the next time frame, a positive potential is applied to the line 66 and a negative potential to the line 64 to reverse the applied voltage potential. This sequence is repeated to enhance the lifetime of the liquid crystal display material.

Figure 4:
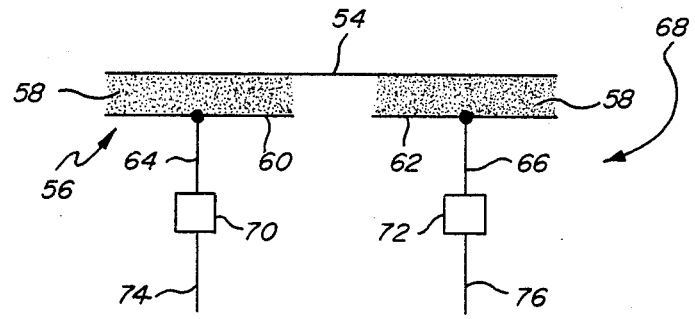
FIG. 4 is a schematic circuit diagram illustrating a second display pixel embodying the present invention.

FIG. 4 illustrates a second pixel embodiment 68 of the invention with elements corresponding to the elements in the pixel 52 having the same numerals. The pixel 68 includes a pair of dual polarity isolation devices 70 and 72 coupled to respective address lines 64 and 66 and to address lines 74 and 76. Although one isolation device is illustrated coupled to each of the electrode segments 60 and 62, since the devices are dual polarity only one of the electrode segments needs to be coupled to an isolation device. The second isolation device adds redundancy to the pixel 68, since the pixel 68 will operate with one of the isolation devices shorted. The applied voltage potential can be reversed as previously described, by alternating the polarity of the one or two isolation devices along with the applied potentials.

Figure 5:
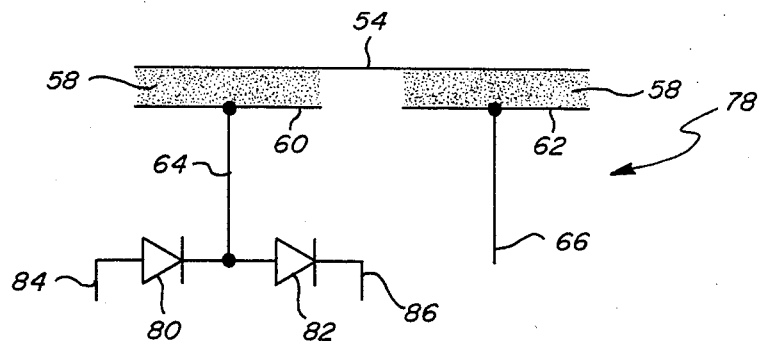
FIG. 5 is a schematic circuit diagram illustrating another display pixel embodying the present invention.

FIG. 5 illustrates another pixel embodiment 78 of the invention, again utilizing numerals corresponding to the pixel 52 where applicable. The electrode segment 60 and the addressing line 64 are coupled through a pair of isolation devices 80 and 82 which are coupled to separate respective lines 84 and 86. To reverse the polarity on the pixel 78, in one time frame a positive potential is applied to the line 84 and a negative potential to the line 66 to forward bias the diode 80. In the next frame, a positive potential is applied to the line 66 and a negative potential to the line 86 to forward bias the diode 82. Generally, the same polarity potential will be applied to both of the lines 84 and 86 in each time frame to reverse bias the other diode.

Figure 6:
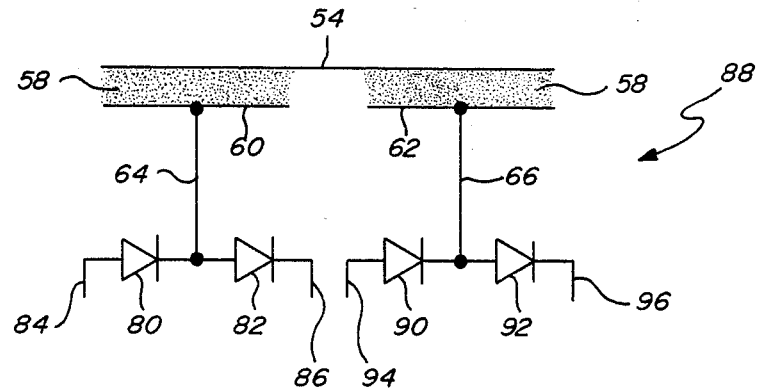
FIG. 6 is a schematic circuit diagram illustrating a further display pixel embodying the present invention.

Another pixel embodiment 88 is illustrated in FIG. 6. The corresponding numerals are again utilized without further description. The pixel 88 includes a second pair of isolation devices 90 and 92 coupled to the address line 66 and to respective address lines 94 and 96. The second pair of devices 90 and 92 add more complete isolation to the pixel 88 and also provide redundancy to the pixel 88. The pixel 88 and hence the display will operate with any one of the isolation devices 80, 82, 90 and 92 shorted. As will be discussed hereinafter, the most likely defect in the preferred type of isolation device is an electrical short.

To reverse the polarity on the pixel 88, in one time frame a positive potential is applied to the line 84 and a negative potential is applied to the line 96 to forward bias the isolation devices 80 and 92. In the next frame, a positive potential is applied to the line 94 and a negative potential to the line 86 to forward bias the isolation devices 82 and 90. Again, the second devices can be reverse biased in each time frame.

Referring to FIG. 7, a partially diagrammatic and partially schematic diagram of one embodiment of the pixel 88 is illustrated. The common electrode 54 is not illustrated, but would substantially overlie the areas of the electrode segments 60 and 62. Separate y line connections 64 are shown as well as separate x line connections 66 to the pixel electrode segments 60 and 62. Electrically these are equivalent to the schematic diagram in FIG. 3. Each of the lines 84, 86, 94 and 96 is isolated from one another.

Figure 9:
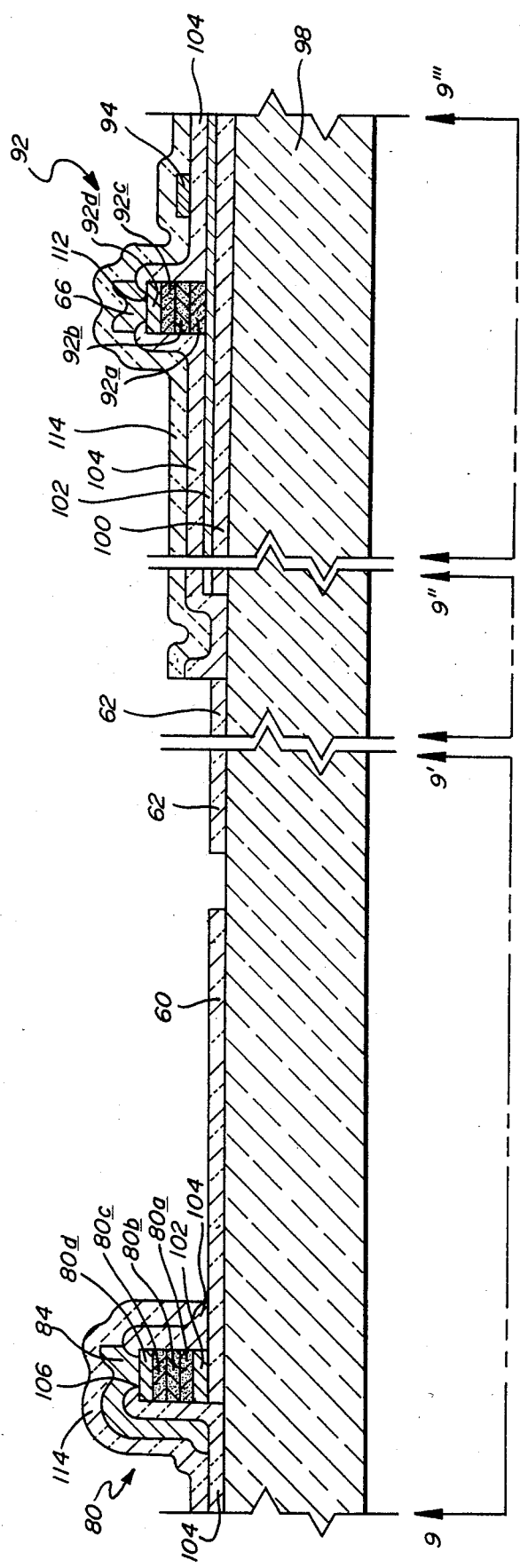

The pixel 88 is illustrated in top plan view in FIG. 8 and a side sectional view in FIG. 9. The cross sectional view in FIG. 9 is taken along the line 9—9', 9'—9" and 9"—9"' in FIG. 8. The pixel 88 is formed on an insulative substrate 98, such as glass. The electrode segments 60 and 62 are formed on the substrate 98 and can be formed of a transparent conductive layer 100, such as deposited indium tin oxide (ITO). The lines or leads 86 and 96 are also formed on the substrate 98. The lines 86 and 96 can be formed from the ITO layer 100 and a top metal layer 102, or they can be formed from just a conductive material such as metal, for example, aluminum, molybdenum, or a molybdenum tantalum alloy. Other suitable metals are chromium, tantalum tungsten, palladium and platinum. The lines 86 and 96 can be formed by, for example, magnetron sputtering the metal over the entire surface area of the glass substrate 98 and then removing selected portions of the deposited metal by utilizing a mask and photolithography techniques of the types well known in the art.

The isolation devices 80, 82, 90 and 92 then are formed, preferably from a deposited semiconductor material. The devices are formed as diodes for illustration purposes, but can be any of the above enumerated isolation devices. The deposited semiconductor material is preferably an amorphous semiconductor alloy including silicon. The amorphous silicon alloy can also include hydrogen and/or fluorine and can be deposited by plasma assisted chemical vapor deposition i.e. glow discharge as disclosed, for example, in U.S. Pat. No. 4,226,898 which issued on Oct. 7, 1980 in the names of Stanford R. Ovshinsky and Arun Madan for Amorphous Semiconductors Equivalent To Crystalline Semiconductors Produced By A Glow Discharge Process. The diodes preferably have a p-i-n configuration, best illustrated in FIG. 9, formed by a first doped region 80a and 92a, which can be n-type, an intrinsic region 80b and 92b overlying the first doped regions 80a and 92a respectively, and a second doped region 80c and 92c, which can be p-type, overlying the intrinsic regions 80b and 92b respectively. The diodes also preferably include a top conductive layer 80d and 92d.

More specifically, the diodes can be formed by depositing the previously mentioned conductive layer 100, metal layer 102, amorphous silicon alloy regions and top conductive layer over the entire surface area of the substrate 98, and thereafter selectively etching portions of the top metal layer and amorphous silicon alloy regions by utilizing a suitable mask and conventional photolithography techniques. The mask utilized during the etching process preferably defines a diode configuration wherein each diode is about 20 to 50 microns on a side. Representative thicknesses for the amorphous silicon alloy regions can be, for example, 300 to 1,000 Angstroms and preferably 500 Angstroms for the p-type regions, 1,000 to 10,000 Angstroms and preferably 3,000 Angstroms for the intrinsic regions, and 100 to 500 Angstroms and preferably 200 Angstroms for the n-type regions.

Once the diodes are formed on the metal layer 102, the diode patterned resist is removed and new resist layers are coated and patterned to form the electrode segments 60 and 62 without the metal layer 102 and the bottom lines 86 and 96 with the metal layer 102. Alternately, the bottom lines 86 and 96 can first be formed of metal and then the diodes formed thereon. Thus, the diode 80 is formed on the electrode segmet 60, the diode 90 on the electrode segment 62, the diode 92 on the line 96 and the diode 82 on the line 86.

A layer of insulating material 104 is next formed over the lines 86 and 96, the substrate 98, the electrode segments 60 and 62, and the diodes 80, 82, 90 and 92. The insulating material 104 can be formed from any deposited insulator such as silicon oxide ($Si_xO_y$) or silicon nitride ($Si_xN_y$), for example. The insulating layer 104 is patterned to define openings or vias 106, 108, 110 and 112 which communicate with the diodes 80, 82, 90 and 92. The layer 104 is also patterned to expose the electrode segments 60 and 62. The pattern of the layer 104 can be obtained by depositing the insulator, for example, over the entire surface area, coating a layer of photoresist over the insulator layer, and then exposing and developing out both of the photoresist and the insulator using a further mask. This step forms the openings or vias 106, 108, 110 and 112 and uncovers upper surface portions of the electrode segments 60 and 62.

The top lines 64, 66, 84 and 94 are then formed coupling the lines, diodes and electrode segments together. The top lines can be formed of a conductive material of the same type as described for the lines 86 and 96. The conductive material for the top lines is generally chosen to be different than that of the bottom lines to obtain a differential etch. A top passivation layer 114 is then formed over the exposed surfaces, which layer is patterned to expose the electrode segments 60 and 62. The top passivation layer 114 can be formed of the same materials and in the same manner as the layer 104.

This forms a completed subassembly of the display and pixel 88. The subassembly is an intermediate product in the manufacturing of the display. The subassembly can be stocked for later use or sold for completion into a display by another party. Further, as more fully described in copending application, Ser. No. 626,214, filed June 29, 1984, entitled "High Yield Liquid Crystal Display and Method Of Making Same", filed concurrently herewith, the subassembly can be electronically tested prior to adding the light influencing material since the electronic circuitry is all on the one substrate 98.

FIG. 10 illustrates a cross sectional side view of the pixel 88 along the line 9—9 of FIG. 8 with a top plane 116, the common electrode 54 and the pixel liquid crystal display material 58. The pixel 88 in FIG. 10 is a completed display pixel.

It must be appreciated that the structure illustrated in FIGS. 8–10 is not drawn to scale and that the common electrode 54 and the electrode segments 60 and 62 define the light influencing display area of the pixel 54. The electrodes are substantially coextensive and can be configured in a square configuration as illustrated in FIG. 8 and can be, for example, 300 to 2,000 microns on a side depending on the overall size of the finished display matrix and the desired aspect ratio. The light influencing material 58 can be of any conventional variety, as for example nematic liquid crystal display material.

As can be appreciated by those skilled in the art, the present invention can be practiced otherwise than as specifically disclosed herein. For example, the diodes of the displays can be formed from deposited semiconductor materials other than amorphous semiconductor alloys which need not be deposited materials. For example, the diodes can be formed from polycrystalline semiconductor alloys. Furthermore the amorphous semiconductor alloy material diodes can be formed from other material configurations than the p-i-n configuration described herein. For example, configurations such as p-$\pi$-n, p-$\nu$-n, p-n, Schottky, etc are possible where $\pi$ and $\nu$ refer to lightly doped p and n-type semiconductor material respectively. Also, if a high voltage threshold is desired for the pixels, the diodes can be formed in a stacked or tandem configuration. Further, as above mentioned, the isolation devices can be other than diodes, such as transistors or other dual polarity devices.

If a further reduction in pixel capacitance is desired, the electrodes could be further subdivided. For example, the pixel common electrode could be divided into two electrode segments and the semented electrode could be divided into three spaced apart electrode segments with the address lines coupled only to the two outer segmeted electrode segments.

We claim:

1. In a display, a pixel comprising:
   a first electrode including at least two spaced apart electrode portions;
   a second electrode spaced from and facing said first electrode portions in substantially parallel relation thereto, said second electrode also being electrically insulated from all external circuit connections and from all other pixel electrodes; and
   light influencing display material between said first electrode portions and said second electrode.

2. The display as defined in claim 1 wherein the active surface area of said second electrode is substantially coextensive with at least substantially all of the active surface areas of said first electrode portions.

3. The display as defined in claim 1 further including at least one isolation device coupled to at least one of said first electrode portions.

4. The display as defined in claim 3 including at least one isolation device coupled to each of said first electrode portions.

5. The display as defined in claim 3 wherein said isolation device is a dual polarity isolation device.

6. The display as defined in claim 3 wherein said isolation device is a thin film transistor.

7. The display as defined in claim 3 wherein said isolation device is a diode ring device.

8. The display as defined in claim 3 wherein said isolation device is a threshold switch.

9. The display as defined in claim 3 wherein said isolation device is a two terminal device.

10. The display as defined in claim 3 wherein said isolation device is a three terminal device.

11. The display as defined in claim 1 further including at least a pair of isolation devices coupled to at least one of said first electrode portions.

12. The display as defined in claim 11 including a pair of isolation devices coupled to each of said first electrode portions.

13. The display as defined in claim 11 wherein said isolation devices are single polarity isolation devices.

14. The display as defined in claim 11 wherein said isolation devices are two terminal devices.

15. The display as defined in claim 11 wherein said isolation deices are three terminal devices.

16. The display as defined in claim 11 wherein said isolation devices are diodes.

17. The display as defined in claim 16 wherein said isolation diodes are formed from deposited semiconductor material.

18. The display as defined in claim 16 wherein said deposited semiconductor material is an amorphous semiconductor alloy.

19. The display as defined in claim 18 wherein said amorphous semiconductor alloy includes silicon.

20. The display as defined in claim 19 wherein said amorphous silicon alloy includes hydrogen.

21. The display as defined in claim 19 wherein said amorphous silicon alloy includes fluorine.

22. The display as defined in claim 17 wherein said diodes include a first doped semiconductor region, a substantially intrinsic semiconductor region overlying said first doped region, and a second doped semiconductor region overlying said intrinsic region, said first and second doped semiconductor regions being opposite in conductivity.

23. The display as defined in claim 22 wherein said substantially intrinsic semiconductor region is slightly doped with one of said conductivities.

24. The display as defined in claim 1 further including means for selectively applying operating potentials to each of said first electrode portions.

25. The display as defined in claim 24 wherein said applying means include means for capacitively coupling said operating potential from one first electrode portion, through said second electrode and to the other said first electrode portion.

26. The display as defined in claim 1 further including at least a pair of pixel address lines, each of said address lines coupled to a respective one of said first electrode portions.

27. The display as defined in claim 1 wherein said light influencing material is liquid crystal display material.

28. The display as defined in claim 27 wherein said liquid crystal display material is nematic material.

29. A display as defined in claim 1 wherein said first electrode includes only two electrode portions.

30. A method of making a light influencing display including at least one pixel, comprising:
    providing a substrate;
    forming a first electrode including at least two spaced apart electrode portions on said substrate;
    forming at least one address line for each of said electrode portions;
    forming a second electrode spaced from and facing said first electrode in substantially parallel relation thereto said second electrode being formed so as to be electrically insulated from all external circuit connections and from all other pixel electrodes; and
    applying a light influencing display material between said first electrode and said second electrode.

31. The method as defined in claim 30 including forming the active area of said second electrode to be coextensive with at least substantially all of the active surface areas of said first electrode.

32. The method as defined in claim 31 including forming at least one isolation device coupling at least one of said address lines to one of said first electrode portions.

33. The method as defined in claim 32 including forming at least one isolation device coupling one of said address lines to each of said first electrode portions.

34. The method as defined in claim 32 including forming said isolation device as a dual polarity isolation device.

35. The method as defined in claim 32 including forming said isolation device as a thin film transistor.

36. The method as defined in claim 32 including forming said isolation device as a diode ring device.

37. The method as defined in claim 32 including forming said isoltation device as a threshold switch.

38. The method as defined in claim 32 including forming said isolation device as a two terminal device.

39. The method as defined in claim 32 including forming said isolation device as a three terminal device.

40. The method as deined in claim 30 including forming at least a pair of isolation devices coupling at least one of said address lines to one of said first electrode portions.

41. The method as defined in claim 40 including forming a pair of isolation devices coupling each of said address lines to one of said first electrode portions.

42. The method as defined in claim 40 including forming said isolation devices as single polarity devices.

43. The method as defined in claim 40 including forming said isolation devices as two terminal devices.

44. The method as defined in claim 40 including forming said isolation devices as three terminal devices.

45. The method as defined in claim 40 including forming said isolation devices as diodes.

46. The method as defined in claim 45 including forming said isolation diodes from deposited semiconductor material.

47. The method as defined in claim 46 including forming said deposited semiconductor material from an amorphous semiconductor alloy.

48. The method as defined in claim 47 including forming said amorphous semiconductor alloy to include silicon.

49. The method as defined in claim 48 including forming said amorphous silicon alloy to include hydrogen.

50. The method as defined in claim 48 including forming said amorphous silicon alloy to include fluorine.

51. The method as defined in claim 46 including forming said diodes by depositing a first doped semiconductor region, depositing a substantially intrinsic semiconductor region over said first doped region, and depositing a second doped semiconductor region over said intrinsic region, said first and second doped semiconductor regions being opposite in conductivity.

52. The method as defined in claim 51 including slightly doping said substantially intrinsic region with one of said conductivities.

53. The method as defined in claim 30 including forming means for selectively applying operating potentials to each of said first electrode portions.

54. The method as defined in claim 30 including forming said light influencing material from liquid crystal display material.

55. The method as defined in claim 54 including forming said liquid crystal display material from nematic material.

56. A method as defined in claim 30 wherein said step of forming said first electrode includes forming only two electrode portions.

* * * * *